(12) United States Patent
Biswas

(10) Patent No.: US 9,813,238 B2
(45) Date of Patent: Nov. 7, 2017

(54) MOBILE SECURITY USING CONTEXT PATTERNS

(71) Applicant: EMPIRE TECHNOLOGY DEVELOPMENT LLC, Wilmington, DE (US)

(72) Inventor: Soma Biswas, Lausanne (CH)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 7 days.

(21) Appl. No.: 14/498,312

(22) Filed: Sep. 26, 2014

(65) Prior Publication Data
US 2016/0094344 A1 Mar. 31, 2016

(51) Int. Cl.
| | |
|---|---|
| *H04W 12/06* | (2009.01) |
| *H04L 9/08* | (2006.01) |
| *H04L 9/30* | (2006.01) |
| *G06F 21/31* | (2013.01) |
| *G06F 21/60* | (2013.01) |

(52) U.S. Cl.
CPC .......... *H04L 9/0866* (2013.01); *G06F 21/316* (2013.01); *G06F 21/606* (2013.01); *H04L 9/3073* (2013.01); *H04W 12/06* (2013.01); *G06F 2221/2111* (2013.01)

(58) Field of Classification Search
CPC ....... H04L 63/107; H04L 9/08; H04L 9/0866; H04L 9/3073; G06F 8/43; G06F 21/6245; G06F 21/6218; G06F 21/31; G06F 21/316; G06F 21/606; G06F 2221/2111; H04W 12/06

USPC ................................................. 726/7; 380/44
See application file for complete search history.

(56) References Cited

U.S. PATENT DOCUMENTS

| | | | |
|---|---|---|---|
| 9,027,076 B2 * | 5/2015 | Roach .................. | H04L 63/107 726/1 |
| 9,111,105 B2 * | 8/2015 | Barton .................... | H04L 41/00 |
| 2012/0185910 A1 | 7/2012 | Mietten et al. | |
| 2015/0379286 A1 * | 12/2015 | Nordback ........... | G06F 21/6209 713/165 |

(Continued)

FOREIGN PATENT DOCUMENTS

| | | |
|---|---|---|
| EP | 1858193 B1 | 5/2011 |
| WO | 2009140646 A1 | 11/2009 |
| WO | 2010047691 A1 | 4/2010 |

(Continued)

OTHER PUBLICATIONS

Signcryption scheme for identity-based cryptosystems. Cryptology ePrint Archive, Report 2003/066 (2002) Nalla, D., Reddy, K.C.*

(Continued)

*Primary Examiner* — Kambiz Zand
*Assistant Examiner* — Benjamin Kaplan
(74) *Attorney, Agent, or Firm* — Dorsey & Whitney LLP

(57) ABSTRACT

Examples of methods, systems, products, devices, and/or apparatus generally related to mobile security are described. An example method may include capturing a context pattern of a user device. The context pattern may be based, at least in part, on data from one or more sensors of the user device. The data may be acquired at multiple different times. The example method may further include generating at least one public-private key pair based, at least in part, on the context pattern.

30 Claims, 5 Drawing Sheets

(56) References Cited

U.S. PATENT DOCUMENTS

2016/0013941 A1* 1/2016 Gungor .................. H04L 9/16 380/44

FOREIGN PATENT DOCUMENTS

WO 2011101531 A1 8/2011
WO 2013003642 A2 1/2013

OTHER PUBLICATIONS

"ID-based encryption", accessed at http://web.archive.org/web/20130112042105/http://en.wikipedia.org/wiki/ID-based_encryption, accessed on Oct. 11, 2012, pp. 6.

"Side channel attack", accessed at http://web.archive.org/web/20140712021312/http://en.wikipedia.org/wiki/Side_channel_attack, accessed on Apr. 14, 2014, pp. 7.

Biswas, D et al., "Privacy preserving and transactional advertising for mobile services", vol. 96, No. 7, Jun. 15, 2013, pp. 1-18.

Camenisch, J et al., "Blind and Anonymous Identity Based Encryption and Authorized Private Searches on Public Key Encrypted Data", Lecture Notes in Computer Science, vol. 5443, 2009, pp. 196-214.

Gupta, A et al., "Using context-profiling to aid access control decisions in mobile devices", 2011 IEEE International Conference on Pervasive Computing and Communications Workshops, Seattle, USA, Mar. 2011, pp. 310-312.

Kukielka, M J., "Evaluating the Effectiveness of Context-Based Security for Mobile Devices", B. Thomas Golisano College of Computing and Information Sciences Rochester Institute of Technology Rochester, New York, Mar. 2012, pp. 73.

Majzoobi, M et al., "Trusted Design in FPGAs", Introduction to Hardware Security and Trust, 2012, pp. 195-229.

Mayhofer, R., "A Framework for Context Prediction", accessed at http://web.archive.org/web/20120113073205/http://mayrhofer.eu.org/contextprediction, accessed on Jul. 17, 2014, pp. 1-2.

Mayhofer, R., "Context authentication", accessed at http://web.archive.org/web/20130113051014/http://www.mayrhofer.eu.org/authentication, accessed on Jul. 17, 2014, pp. 1-2.

Mayrhofer, R., "Ubiquitous Computing Security: Authenticating Spontaneous Interactions", Habilitation Thesis, Mar. 2, 2009, pp. 56.

Rührmair, U et al., "Security Based on Physical Unclonability and Disorder", Introduction to Hardware Security and Trust, Chapter 4, 2012, pp. 65-102.

Sigg, S., "Context-based security: state of the art, open research topics and a case study", Casemans '11 Proceedings of the 5th ACM International Workshop on Context-Awareness for Self-Managing Systems, 2011, pp. 17-23.

Sigg, S., "PINtext: A framework for secure communication based on context", Mobile and Ubiquitous Systems: Computing, Networking, and Services, Lecture Notes of the Institute for Computer Sciences, Social Informatics and Telecommunications Engineering, vol. 104, 2012, pp. 314-325.

* cited by examiner

MOBILE SECURITY USING CONTEXT PATTERNS

BACKGROUND

To provide security, e.g., to protect sensitive user data on mobile devices, data may be encrypted. There is also a need to encrypt or otherwise secure user transactions performed on mobile devices, e.g., financial transactions. Both software and hardware based encryption systems are currently available and used to provide the necessary security primitives.

Conventional hardware based cryptography systems may be based on a Trusted Platform Module (TPM) embedded in the mobile device to provide stronger security.

Physically Unclonable Functions (PUF) may be used which utilize uniqueness with respect to the physical/hardware characteristics of a device, e.g., the device clock/Static Random-Access Memory (SRAM), to provide a PUF based cryptography system. For example, the device clock may be used to generate a PUF which may be used as the basis of a cryptography system.

SUMMARY

Techniques are generally described that include method, devices, and computer readable mediums. An example method may include capturing a context pattern of a user device. The context pattern may be based, at least in part, on data from one or more sensors of the user device. The data may be acquired at multiple different times. The method may include generating at least one public-private key pair based, at least in part, on the context pattern. In some examples, the context pattern may be based, at least in part, on locations of the user device at the multiple different times. In some examples, the context pattern may be based, at least in part, on other users in a vicinity of the user device at the multiple different times. In some examples, the context pattern may be based, at least in part, on an environmental parameter of an environment in a vicinity of the user device at the multiple different times. In some examples, the context pattern may be based, at least in part, on applications executed by the user device at the multiple different times.

Example methods may further include communicating with another device using the public-private key pair.

In some examples, generating at least one public-private key pair may include implementing an identity based encryption procedure. The identity based encryption procedure may utilize a public identification for the user.

In some examples, the context pattern may be stored, encrypted, on the user device.

Another example method may include requesting a predicted context pattern from a user device to authenticate a user. The predicted context pattern may be based, at least in part, on data from one or more sensors of the user device. The data may be acquired at multiple different times. The predicted context pattern may be based, at least in part, on predicted data from one or more sensors of the user device at a future time. The method may further include receiving the predicted context pattern from the user device at a requestor, and authenticating the user at the future time if the predicted context pattern matches a context pattern generated by the requestor using data from the one or more sensors of the user device.

In some examples, the requestor may include an application executing on the user device.

In some examples, the predicted context pattern may match the context pattern using a probabilistic match. In some examples, the predicted context pattern may match the context pattern using an exact match.

In some examples, the predicted context pattern may be based, at least in part, on locations of the user device at the multiple different times. In some examples, the predicted context pattern may be based, at least in part, on other users in a vicinity of the user device at the multiple different times. In some examples, the predicted context pattern may be based, at least in part, on an environmental parameter of an environment in a vicinity of the user device at the multiple different times. In some examples, the predicted context pattern may be based, at least in part, on applications executed by the user device at the multiple different times.

An example device may include at least one processing unit, a sensor, at least one computer executable medium, the at least one computer executable medium encoded with instructions comprising instructions configured to cause the at least one processing unit to perform methods described herein. For example, the computer executable medium may be encoded with instructions to capture a context pattern of the device, wherein the context pattern is based, at least in part, on data from the sensor, wherein the data is acquired at multiple different times. The instructions may further include instructions to generate at least one public-private key pair based, at least in part, on the context pattern.

At least one computer executable medium may be provided. In an example, at least one computer executable medium may be encoded with instructions comprising instructions configured to cause at least one processing unit to capture a context pattern of a user device, wherein the context pattern is based, at least in part, on data from at least one sensor of the user device, wherein the data is acquired at multiple different times, and generate at least one public-private key pair based, at least in part, on the context pattern.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

DETAILED DESCRIPTION

Figure 1:
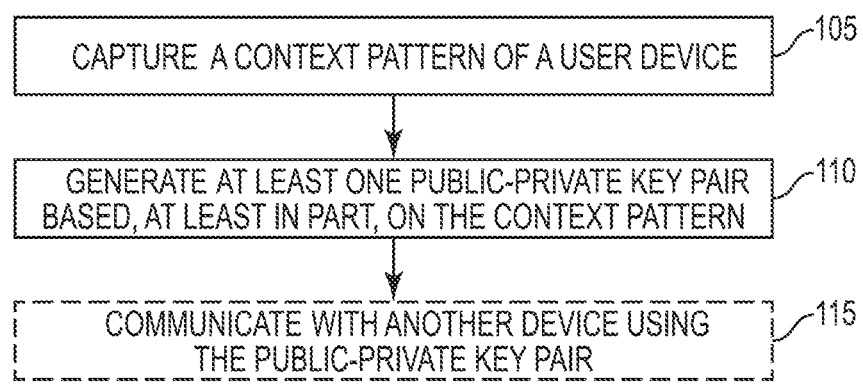
FIG. 1 is a flowchart illustrating an example method for mobile security.

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are implicitly contemplated herein.

As mentioned above, Physically Unclonable Functions (PUF) that utilize uniqueness with respect to the physical/hardware characteristics of a device, e.g., the device clock/SRAM, may be used to provide a PUF based cryptography system. Generally, however, PUFs, or cryptography systems based on physical characteristics of a device may have drawbacks—for example, they may be expensive to produce, difficult to update or modify (e.g., if a cryptography key needs to be revoked, or if the system needs to be updated to adapt to a vulnerability), and the system may be exploited if the device is stolen since anyone in possession of the device may have access to the needed physical characteristics.

Examples described herein include context based cryptography systems. Example cryptography systems may not be based on physical characteristics of devices, but rather may be based on context patterns, and may be referred to as contextually unclonable functions (CUFs). In some examples, cryptography systems based on CUF may have certain advantages including, but not limited to, ease of capturing the context pattern, easy to update or revoke cryptography keys since they may be purely software based, and since the context may be specific to the user, not the device, it may not be exploited if stolen in some examples.

The example advantages and drawbacks of conventional systems discussed herein are provided by way of example only. It is to be understood that not all examples display all, or even any, of the described advantages. Similarly, not all examples may address all, or even any, of the described drawbacks of conventional systems.

This disclosure is drawn, inter alia, to methods, systems, products, devices, and/or apparatus generally related to mobile security. An example method may include capturing a context pattern of a user device. The context pattern may be based, at least in part, on data from one or more sensors of the user device. The data may be acquired at multiple different times. The example method may further include generating at least one public-private key pair based, at least in part, on the context pattern.

FIG. 1 is a flowchart illustrating an example method for mobile security, arranged in accordance with at least some embodiments described herein. As depicted, the example method may include one or more operations, functions or actions as illustrated by one or more of blocks 105, 110, and/or 115. The operations described in the blocks 105-115 may be performed in response to execution (such as by one or more processors described herein) of computer-executable instructions stored in a computer-readable medium, such as a computer-readable medium of a computing device or some other controller similarly configured.

An example process may begin with block 105, which recites "capture a context pattern of a user device." Block 105 may be followed by block 110, which recites "generate at least one public-private key pair based, at least in part, on the context pattern." Block 110 may be followed by block 115, which recites "communicate with another device using the public-private key pair."

The blocks included in the described example methods are for illustration purposes. In some embodiments, the blocks may be performed in a different order. In some other embodiments, various blocks may be eliminated. In still other embodiments, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc. In some examples, the communication described in block 115 may not occur.

Block 105 recites "capture a context pattern of a user device." The context pattern may be based, at least in part, on data from one or more sensors of the user device. The data may be acquired at multiple different times. The user device may be any of a variety of devices, including mobile devices. Example devices include, but are not limited to, cellular telephones, tablets, laptops, desktops, wearable devices, appliances, and automobiles. The user's context pattern (rather than a physical device characteristic), may be used as the unique characteristic to provide mobile security. Context patterns may be based on a variety of user-dependent activities, including but not limited to, locations the user goes to, applications used or being used by the user, and pictures or videos captured by the user. Generally, the context pattern may include data from the user-dependent activities which are gathered over time—e.g., data from multiple different times may be included in the context pattern.

In some examples, a context pattern may be based, at least in part, on locations of the user device at multiple different times (that is, the locations that the user device was or is at during or at the various different times). In some examples, a context pattern may be based, at least in part, on other users in a vicinity of the user device at multiple different times. For example, the context pattern may be based on identity of other users in a vicinity of the user device, which may be captured, for example, by noting identity of users in a vicinity of the user device as provided to the user device. Identity of other users may also be captured, for example, by noting a hardware signature of a device associated with the other users. In some examples, the context pattern may be based, at least in part, on an environmental parameter (e.g., temperature, humidity) of an environment in a vicinity of the user device at multiple different times. In some examples, a context pattern may be based, at least in part, on applications executed by or executing on the user device at multiple different times.

The context pattern may be stored on the user device. In some examples, the context pattern may be stored encrypted on the user device. The context pattern in some examples may be stored on another device, e.g., in the cloud.

Examples described herein may utilize location of a user device (e.g., movement pattern) to generate the context pattern; however other context patterns may also be used which are based, for example, on proximity of other users to the user device, environmental parameters, and/or applications executed by or executing on the user device.

The context pattern may be based, at least in part, on data from one or more sensors of the user device. For example, when location is used to provide the context pattern, a data from a GPS or other location sensor may provide the data used to generate the context pattern. In other examples, the sensor may include an application or other component of the device which may provide a notification of, for example, applications used or being used by the user, or pictures or videos captured by the user. The sensor application may provide a log or other record of the user activity which may be used to provide a context pattern. Other sensors may also be used in other examples. The record of the user activity may include activity at different times (e.g., a history of activity).

Examples of context patterns include context patterns based on movement of a user (e.g., locations of a user over time). Accordingly, a context pattern may include data relating to a history of a user's movements, which may include either or both of exterior and interior movements. Exterior movements may refer to movement of the user outdoors or outside of structures (e.g., movement on roads, places visited, GPS coordinates of outdoor locations, or combinations thereof). Interior movements may refer to movements of the user within a building or other structure or confined area (e.g., within a building, house, shopping mall, office, or combinations thereof). A context pattern may be represented as a directed graph as follows:

$$M := G(V, E);$$

where the set of vertices V corresponds to location anchors, which may be, for example, landmarks, buildings, or street intersections. E is the set of edges with each edge $e = (v_i, v_j)$ in E corresponding to a road or route taken by the user to reach location $v_j$ starting from location $v_i$.

To capture movement within a building, the vertices may be considered as corresponding to a concatenation of aspects of the building, for example, 'building floor number+apartment number+room number' and the edges may be considered routes from one room to another.

Accordingly, a directed graph may be developed which may be provided as a context pattern including locations of a user at different times and routes taken by the user between locations in some examples.

Block 110 recites "generate at least one public-private key pair based, at least in part, on the context pattern." Generally, examples herein utilize a parameter, $K_m$, unique and private to a user, which may be provided based on the user's context pattern taken a particular time t. For example, a context pattern including location history for a particular time interval from a time prior to t through time t may be used, with locations at different times being included in the context pattern.

The private key at time t may be generated using a parameter represented as:

$$K_{mt}^* = M_t.$$

Accordingly, the parameter $K_{mt}$ used to generate a private key may be provided by encoding the user's context pattern (e.g., directed graph M) at time t into a coded string $K_m^*$.

A public key may also be provided (e.g., a publicly visible user ID). Generally, any publicly visible string may be utilized as the public key, including, but not limited to, the user's email address, International Mobile Equipment Identity (IMEI) number, or combinations thereof.

Block 115 recites "communicate with another device using the public-private key pair." For example, communications may be encrypted using the public-private key pair. In some examples, at least one public-private key pair may be generated, which may include implementing an identity based encryption procedure. The identity based encryption procedure may utilize a public identification for the user.

The encryption/decryption scheme may include some or all of the following functions:

Encrypt (m, ID)=c: Encrypt message m to c using ID as the public key;

Gen ($K_{mt}^*$, ID)=$p_k$: Generate the private key based on parameter $K_m^*$ (e.g., context pattern at time t) and public ID.

Decrypt ($p_k$, c)=m: Returns plaintext message m on decrypting c using private key $p_k$.

In this manner, a message (e.g., a string of plaintext) may be encrypted using a public key, which may be provided based on a user ID. A private key may be generated based on a context pattern and the public ID. The message may then be decrypted by a receiving device using the private key. The encrypted message may be encrypted on the user device and communicated to a receiving device over any connection, wired or wireless.

Note that in some examples, it may be relatively easy to re-generate new public/private key pairs. For example, the context pattern may constantly evolve with time, providing a continuous stream of context patterns over time which may be utilized to re-generate a new public/private key pair. In cases where a more static unique identifiers were used, e.g., an IMEI number, to generate a private key, it may be more difficult to regenerate a new key if the number is compromised since the number may not change until, for example, a user gets a new device.

Security of methods such as the method of FIG. 1 using a context pattern may be explained in terms of the unclonability of the unique user characteristic—e.g., the context pattern, which may be based on location history. When the context pattern (e.g., location history) is stored only locally on a user's device, and the device is in the user's possession, the location history cannot be cloned. Examples of the system may even be secure against attacks by an attacker who follows the user wherever they go. Security against such an attacker may be provided because the context pattern may be based on a user's location history from a time $t_{initial}$ to $t_{final}$. For example, the user's location at multiple different times between the time $t_{initial}$ and $t_{final}$ may be used to generate the context pattern. In some examples, the time $t_{initial}$ may refer to a start time when a user initially purchased or obtained the device. Accordingly, an attacker may not be able to clone the context pattern if the attack begins after that time. Moreover, in some examples while the attacker might follow the user in external locations, it may be more difficult to clone a user's indoor movements (e.g., within a house or other structure). Accordingly, some example schemes have improved security by including data in the context pattern (e.g., location data) from locations where an attacker may be unable to follow a user. In some examples, the context pattern may include both location history and other information (e.g., the user's interaction history with the device) which may improve the unclonability of the context pattern.

Figure 2:
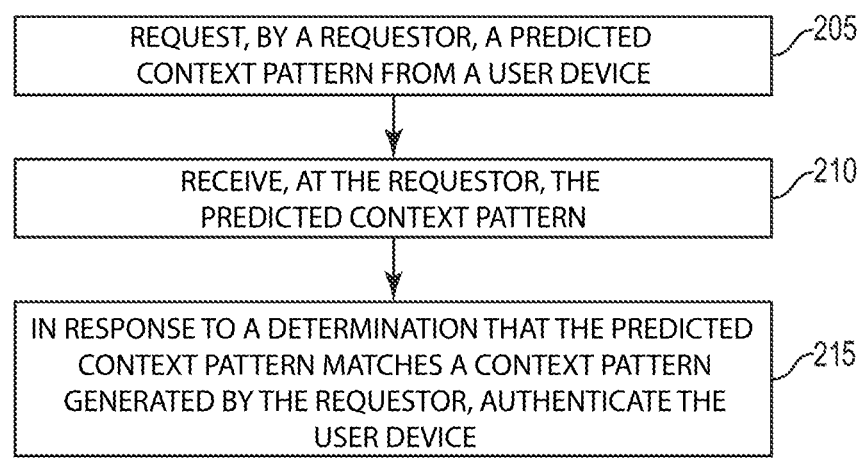
FIG. 2 is a flowchart illustrating an example method for mobile authentication.

FIG. 2 is a flowchart illustrating an example method for mobile authentication, arranged in accordance with at least some embodiments described herein. An example method may include one or more operations, functions or actions as illustrated by one or more of blocks 205, 210, and/or 215. The operations described in the blocks 205-215 may be performed in response to execution (such as by one or more processors described herein) of computer-executable instructions stored in a computer-readable medium, such as a computer-readable medium of a computing device or some other controller similarly configured.

An example process may begin with block 205, which recites "request, by a requestor, a predicted context pattern from a user device." Block 205 may be followed by block 210, which recites "receive, at the requestor, the predicted context pattern." Block 210 may be followed by block 215, which recites "in response to a determination that the predicted context pattern matches a context pattern generated by the requestor, authenticate the user device."

The blocks included in the described example methods are for illustration purposes. In some embodiments, the blocks may be performed in a different order. In some other embodiments, various blocks may be eliminated. In still other embodiments, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc.

Block 205 recites "request, by a requestor, a predicted context pattern from a user device." Examples of user devices and context patterns are described herein. Examples described herein may utilize context pattern prediction as an authentication measure. Examples described herein may discuss authentication using context patterns based on location history, however other context patterns may also be used in other examples.

Examples of user devices described herein may provide predicted context patterns. For example, the location history M may be captured and maintained (e.g., stored) on a user device. An authentication module on a mobile device may include a context pattern prediction engine. Based on the present location history M, the context pattern prediction engine may predict a user's next or current context data (e.g., location).

The context pattern and context pattern prediction engine may be stored on the user device. In some examples, the context pattern may be stored encrypted on the user device. The context pattern and/or context prediction engine may in some examples be stored on another device, e.g., in the cloud.

During authentication, a requestor may request a predicted context pattern from a user device (e.g., in block 205 of FIG. 2). The requestor may be another device, including but not limited to, a mobile device (e.g., phone, tablet) or other electronic device (e.g., desktop, laptop, server, appliance, automobile). The request may be provided by processes including, but not limited to, an application on the requestor or a web service. The request provided in block 205 may be for information related to the predicted context pattern (e.g., a likely current or future location of the user device).

In some examples, the request may be provided to the user device itself, e.g., in examples where the context pattern and/or context pattern prediction engine are stored on the user device. In some examples, the request may be provided to another device (e.g., a cloud service provider), for example in examples where the context pattern and/or context pattern prediction engine are stored at the different device (e.g., cloud service provider).

Block 210 recites "receive, at the requestor, the predicted context pattern." The user device may provide the predicted context pattern, or portion thereof, to the requestor responsive to a request. The response may be based on the context pattern model applied by the context pattern prediction engine. For example, the user device may return a context pattern including a predicted location at a current or future time given a context pattern through a historical time. The user device may in some examples return on the predicted location at a current or future time (e.g., without an entire historical context pattern).

Block 215 recites "in response to determination that the predicted context pattern matches a context pattern generated by the requestor, authenticate the user device." Validation of a user device may be successful if the response (e.g., context pattern or portion thereof, such as current or future location), matches a context pattern independently detected or predicted by the requestor. A match may include exact matches and probabilistic matches in some examples. If there is no match in block 215, in some examples alternative authentication mechanisms may be used to reduce false negatives.

The requestor may independently detect or predict context patterns, or portions thereof, for example by implementing a context pattern model independently, or by sensing data associated with the user (e.g., current location).

Figure 3:
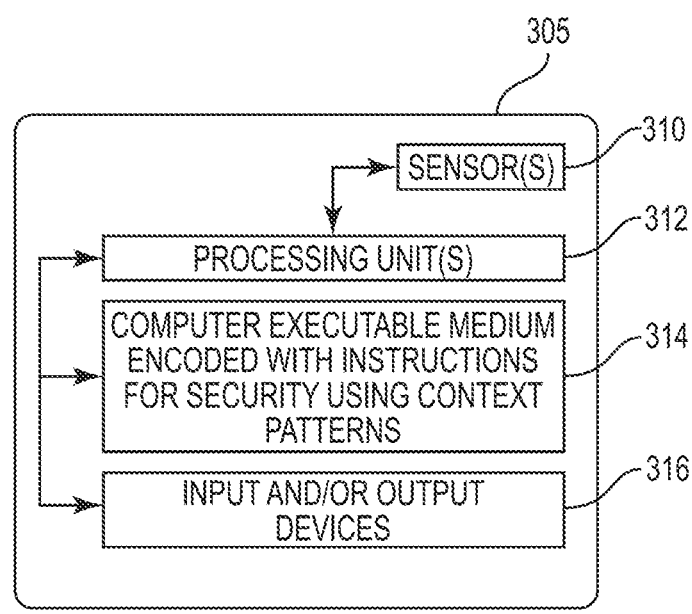
FIG. 3 is a schematic illustration of a user device configured to provide mobile security.

FIG. 3 is a schematic illustration of a user device 305 configured to provide mobile security, arranged in accordance with at least some embodiments described herein. FIG. 3 shows user device 305, including sensor(s) 310, processing unit(s) 312, computer executable medium 314, and input and/or output devices 316. The various components described in FIG. 3 are merely examples, and other variations, including eliminating components, combining components, and substituting components are all contemplated.

As described herein the user device 305 may be implemented using any of a variety of devices, including mobile devices. Example devices include, but are not limited to, cellular telephones, tablets, laptops, desktops, wearable devices, and automobiles. In other examples, other devices may be used.

The user device 305 may include one or more sensor(s) 310, which may be used to provide data used in one or more context patterns described herein. The sensor(s) may accordingly include, but are not limited to, location sensors (e.g., GPS sensor), environmental sensors (e.g., temperature and/or humidity sensor), and proximity sensors. Other sensors which may be used to implement the sensor(s) 310 include other software applications, e.g., applications which track a user's interaction with the device 305, e.g., photos taken, files accessed, videos played, or combinations thereof.

The user device 305 may include one or more processing units) 312. The one or more processing unit(s) may be implemented, for example, using any kind or number of processors (e.g., single or multicore processors). The one or more processing unit(s) may in some examples be implemented in whole or in part using customized circuitry, e.g., ASICs or other circuits.

The computer executable medium 314 may be implemented using one or more computer executable mediums. Media used to implement the computer executable medium 314 may be implemented using any type of electronic storage, including but not limited to, memory including flash, RAM, and/or ROM. Other storage may be used, including but not limited to, disk drives, solid state drives, optical storage, or combinations thereof.

The computer executable medium 314 may be encoded with instructions for security using context patterns. For example, the computer executable medium 314 may be encoded with instructions for mobile security in accordance with the methods described with reference to FIGS. 1 and 2. The computer executable medium 314 may be encoded with instructions for a context pattern prediction engine, examples of which have been described with reference to FIG. 2. The computer executable medium 314, or other electronic storage accessible to the user device 305, may store context patterns and/or predicted context patterns as described herein.

The processing unit(s) 312 may operate in cooperation with instructions encoded in the computer executable medium 314 to perform methods for mobile security described herein, e.g., with reference to FIGS. 1 and 2.

The user device 305 may include input and/or output devices 316. The input and/or output devices may include, but are not limited to, one or more displays, keyboards, touch screens, network adaptors, communication interfaces, or combination thereof. The input and/or output devices may be utilized to provide data for use in developing context patterns and/or communicating with other devices using messages encrypted with public-private key pairs described herein.

Figure 4:
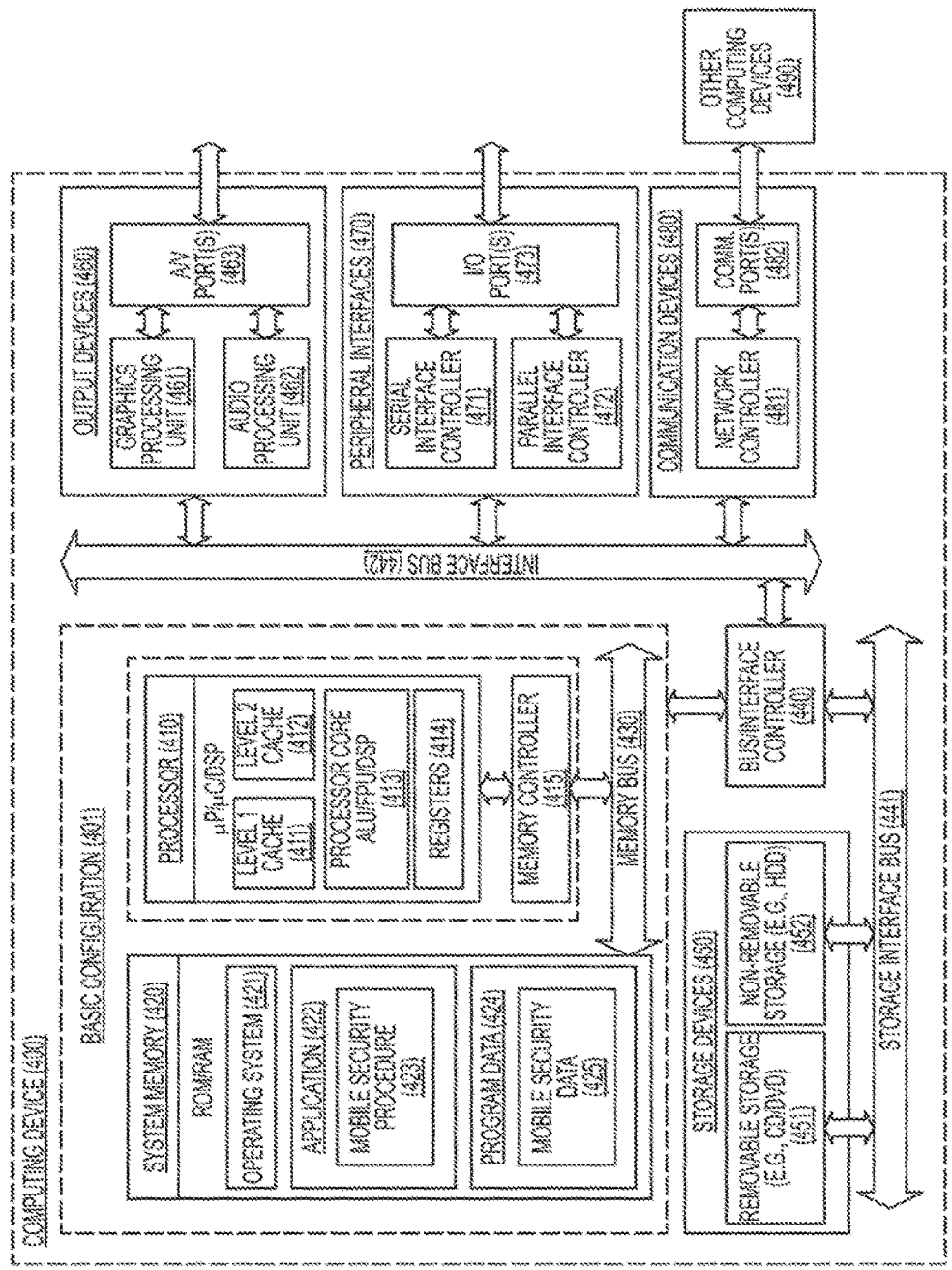
FIG. 4 is a block diagram illustrating an example computing device, which may be configured to provide mobile security.

FIG. 4 is a block diagram illustrating an example computing device 400, which may be configured to provide mobile security, arranged in accordance with at least some embodiments described herein. The computing device 400 may be used, in some examples, to implement the user device 305 of FIG. 3. In a very basic configuration 401, computing device 400 typically includes one or more processors 410 and system memory 420. A memory bus 430 may be used for communicating between the processor 410 and the system memory 420.

Depending on the desired configuration, processor 410 may be of any type including but not limited to a microprocessor (µP), a microcontroller (µC), a digital signal processor (DSP), or any combination thereof. Processor 410 may include one or more levels of caching, such as a level one cache 411 and a level two cache 412, a processor core 413, and registers 414. An example processor core 413 may include an arithmetic logic unit (ALU), a floating point unit (FPU), a digital signal processing core (DSP Core), or any combination thereof. An example memory controller 415 may also be used with the processor 410, or in some implementations, the memory controller 415 may be an internal part of the processor 410.

Depending on the desired configuration, the system memory 420 may be of any type including but not limited to volatile memory (such as RAM), non-volatile memory (such as ROM, flash memory, etc.) or any combination thereof. System memory 420 may include an operating system 421, one or more applications 422, and program data 424. Application 422 may include a mobile security procedure 423 that is arranged to provide mobile security as described herein. Program data 424 may include mobile security data 425, which includes, but is not limited to, context patterns, predicted context patterns and/or other information useful for the implementation of mobile security as described herein. In some embodiments, application 422 may be arranged to operate with program data 424 on an operating system 421 such that any of the procedures described herein may be performed. This described basic configuration is illustrated in FIG. 4 by those components within dashed line of the basic configuration 401.

Computing device 400 may have additional features or functionality, and additional interfaces to facilitate communications between the basic configuration 401 and any required devices and interfaces. For example, a bus/interface controller 440 may be used to facilitate communications between the basic configuration 401 and one or more storage devices 450 via a storage interface bus 441. The storage devices 450 may be removable storage devices 451, non-removable storage devices 452, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 420, removable storage 451 and non-removable storage 452 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 442 for facilitating communication from various interface devices (e.g., output interfaces, peripheral interfaces, and communication interfaces) to the basic configuration 401 via the bus/interface controller 440. Example output devices 460 include a graphics processing unit 461 and an audio processing unit 462, which may be configured to communicate to various external devices such as a display or speakers via one or more A/V ports 463. Example peripheral interfaces 470 include a serial interface controller 471 or a parallel interface controller 472, which may be configured to communicate with external devices such as input devices (e.g., keyboard, mouse, pen, voice input device, touch input device, etc.) or other peripheral devices (e.g., printer, scanner, etc.) via one or more I/O ports 473. An example communication device 480 includes a network controller 481, which may be arranged to facilitate communications with one or more other computing devices 490 over a network communication link via one or more communication ports 482.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RE), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

Figure 5:
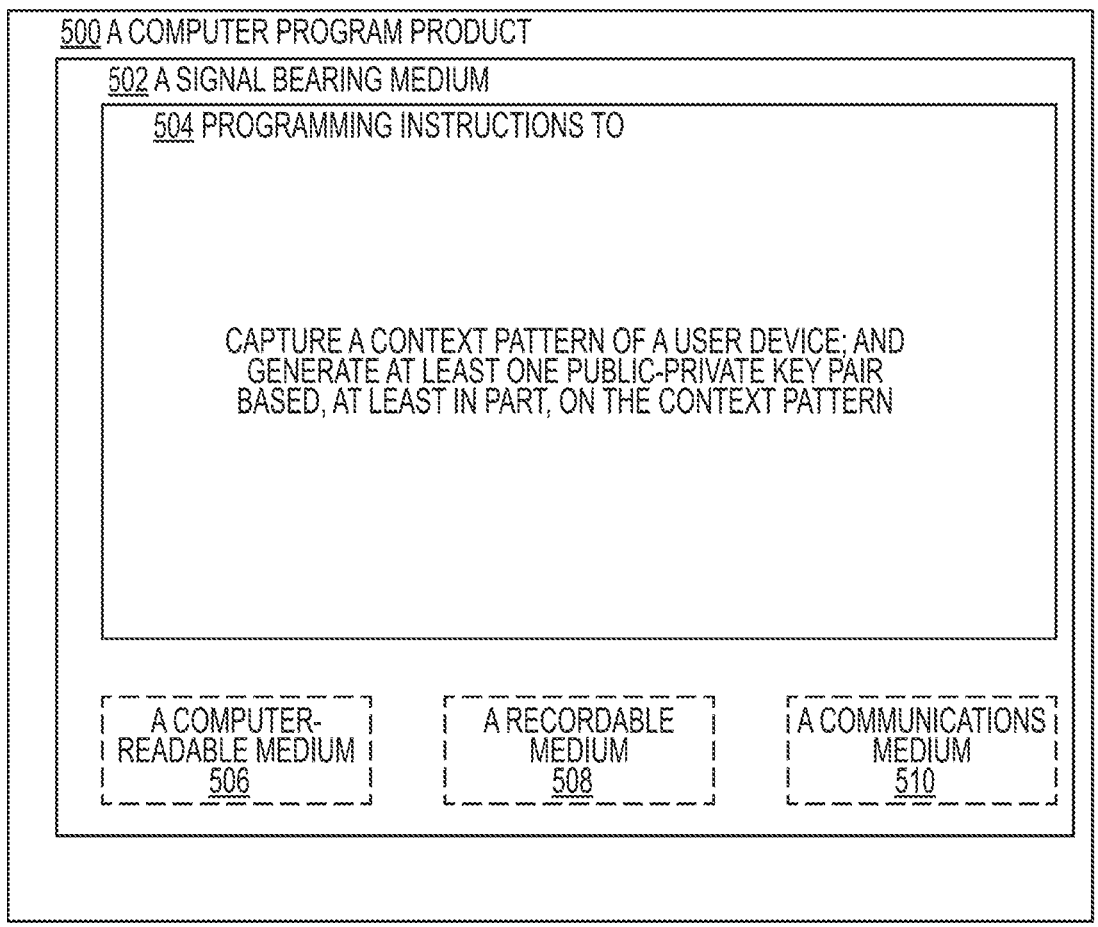
FIG. 5 is a block diagram illustrating an example computer program product that is arranged to store instructions for mobile security, all arranged in accordance with at least some embodiments described herein.

FIG. 5 is a block diagram illustrating an example computer program product 500 that is arranged to store instructions for mobile security, arranged in accordance with at least some embodiments described herein. The computer program product 500 may be used to implement the computer executable medium 314 of FIG. 3 in some examples. The signal bearing medium 502 which may be implemented as or include a computer-readable medium 506, a recordable medium 508, a communications medium 510, or combinations thereof, stores programming instructions 504 that may configure the processing unit to perform all or some of the processes previously described. These instructions may include, for example, one or more executable instructions for causing capture of a context pattern of a user device, wherein the context pattern is based, at least in part, on data from at least one sensor of the user device, wherein the data is acquired at multiple different times. The instructions may include, for example, one or more executable instructions for causing generation of at least one public-private key pair based, at least in part, on the context pattern. In some examples, the instructions 504 may further include instructions for communicating with another device using the public-private key pair.

In other examples, the instructions 504 may be used to implement a requestor as described herein, the instructions 504 may include instructions for requesting a predicted context pattern from a user device to authenticate a user, wherein the predicted context pattern is based, at least in part, on data from one or more sensors of the user device, wherein the data is acquired at multiple different times, and wherein the predicted context pattern is based, at least in part, on predicted data from one or more sensors of the user device at a future time. The instructions may include receiving the predicted context pattern from the user device at the requestor. The instructions may include authenticating the user at the future time if the predicted context pattern matches a context pattern generated by the requestor using data from the one or more sensors of the user device.

The present disclosure is not to be limited in terms of the particular examples described in this application, which are intended as illustrations of various aspects. Many modifications and examples can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and examples are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular examples only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 items refers to groups having 1, 2, or 3 items. Similarly, a group having 1-5 items refers to groups having 1, 2, 3, 4, or 5 items, and so forth.

While the foregoing detailed description has set forth various examples of the devices and/or processes via the use of block diagrams, flowcharts, and/or examples, such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the examples disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. For example, if a user determines that speed and accuracy are paramount, the user may opt for a mainly hardware and/or firmware vehicle; if flexibility is paramount, the user may opt for a mainly software implementation; or, yet again alternatively, the user may opt for some combination of hardware, software, and/or firmware.

In addition, those skilled in the art will appreciate that the mechanisms of the subject matter described herein are capable of being distributed as a program product in a variety of forms, and that an illustrative example of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a Compact Disc (CD), a Digital Video Disk (DVD), a digital tape, a computer memory, etc.; and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A method comprising:
   capturing a context pattern of a user device, wherein the context pattern is based, at least in part, on data from one or more sensors of the user device, wherein the data is acquired at multiple different times and includes locations of the user device at the multiple different times;
   generating at least one public-private key pair, wherein a public key or a private key of the at least one public-private key pair is based, at least in part, on the context pattern; and
   authenticating the user device using the at least one public-private key pair.

2. The method of claim 1, wherein the context pattern is based, at least in part, on routes taken by the user device between the locations.

3. The method of claim 1, wherein the context pattern is based, at least in part, on other users in a vicinity of the user device at the multiple different times.

4. The method of claim 1, wherein the context pattern is based, at least in part, on an environmental parameter of an environment in a vicinity of the user device at the multiple different times.

5. The method of claim 1, wherein the context pattern is based, at least in part, on applications executed by the user device at the multiple different times.

6. The method of claim 1, further comprising communicating with another user device using the at least one public-private key pair.

7. The method of claim 1, wherein the generating the at least one public-private key pair comprises implementing an identity based encryption procedure.

8. The method of claim 7, wherein the identity based encryption procedure utilizes a public identification for the user device.

9. The method of claim 1, wherein the context pattern is stored, encrypted, on the user device.

10. A method comprising:
requesting a predicted context pattern from a user device to authenticate a user, the predicted context pattern including a prediction of a future or current context pattern of the user device, wherein the predicted context pattern is based, at least in part, on data from one or more sensors of the user device, wherein the data is acquired at multiple different times, and wherein the predicted context pattern is based, at least in part, on predicted data from the one or more sensors of the user device at a future time;
receiving the predicted context pattern from the user device at a requestor;
generating a context pattern using the data from the one or more sensors of the user device, wherein the data from the one or more sensors of the user device includes locations of the user device at the multiple different times; and
authenticating the user at the future time if the predicted context pattern matches the generated context pattern.

11. The method of claim 10, wherein the requestor comprises an application executing on the user device.

12. The method of claim 10, wherein the predicted context pattern matches the generated context pattern using a probabilistic match.

13. The method of claim 10, wherein the predicted context pattern matches the generated context pattern using an exact match.

14. The method of claim 10, wherein the predicted context pattern is based, at least in part, on the locations of the user device at the multiple different times.

15. The method of claim 10, wherein the predicted context pattern is based, at least in part, on other users in a vicinity of the user device at the multiple different times.

16. The method of claim 10, wherein the predicted context pattern is based, at least in part, on an environmental parameter of an environment in a vicinity of the user device at the multiple different times.

17. The method of claim 10, wherein the predicted context pattern is based, at least in part, on applications executed by the user device at the multiple different times.

18. A device comprising:
at least one processing unit;
a sensor,
at least one computer executable medium, wherein the at least one computer executable medium encoded with instructions comprises instructions configured to cause the at least one processing unit to:
capture a context pattern of the device, wherein the context pattern is based, at least in part, on data from the sensor, wherein the data is acquired at multiple different times and includes locations of the device at the multiple different times;
generate at least one public-private key pair, wherein a public key or a private key of the at least one public-private key pair is based, at least in part, on the context pattern; and
authenticate the device using the at least one public-private key pair.

19. The device of claim 18, further comprising storage configured to store the context pattern.

20. The device of claim 19, wherein the instructions further comprise instructions configured to cause the at least one processing unit to encrypt the context pattern and store the encrypted context pattern in the storage.

21. The device of claim 18, wherein the context pattern is based, at least in part, on routes taken by the device between the locations.

22. The device of claim 18, wherein the context pattern is based, at least in part, on users in a vicinity of the device at the multiple different times.

23. The device of claim 18, wherein the context pattern is based, at least in part, on an environmental parameter of an environment in a vicinity of the device at the multiple different times.

24. The device of claim 18, wherein the context pattern is based, at least in part, on applications executed by the device at the multiple different times.

25. At least one computer executable medium, wherein the at least one computer executable medium encoded with instructions comprises instructions configured to cause at least one processing unit to:
capture a context pattern of a user device, wherein the context pattern is based, at least in part, on data from at least one sensor of the user device, wherein the data is acquired at multiple different times and includes locations of the user device at the multiple different times;
generate at least one public-private key pair, wherein a public key or a private key of the at least one public-private key pair is based, at least in part, on the context pattern; and
authenticate the user device using the at least one public-private key pair.

26. The at least one computer executable medium of claim 25, wherein the context pattern is based, at least in part, on routes taken by the user device between the locations.

27. The at least one computer executable medium of claim 25, wherein the context pattern is based, at least in part, on other users in a vicinity of the user device at the multiple different times.

28. The at least one computer executable medium of claim 25, wherein the context pattern is based, at least in part, on an environmental parameter of an environment in a vicinity of the user device at the multiple different times.

29. The at least one computer executable medium of claim 25, wherein the context pattern is based, at least in part, on applications executed by the user device at the multiple different times.

30. The at least one computer executable medium of claim 25, wherein the instructions further comprise instructions configured to cause the at least one processing unit to communicate with another device using the at least one public-private key pair.

* * * * *

UNITED STATES PATENT AND TRADEMARK OFFICE
CERTIFICATE OF CORRECTION

| | | |
|---|---|---|
| PATENT NO. | : 9,813,238 B2 | Page 1 of 1 |
| APPLICATION NO. | : 14/498312 | |
| DATED | : November 7, 2017 | |
| INVENTOR(S) | : Biswas | |

It is certified that error appears in the above-identified patent and that said Letters Patent is hereby corrected as shown below:

In the Specification

In Column 8, Line 45, delete "units)" and insert -- "unit(s)" --, therefor.

In Column 10, Line 52, delete "(RE)," and insert -- "(RF)," --, therefor.

In the Claims

In Column 15, Line 44, in Claim 18, delete "sensor," and insert -- sensor; --, therefor.

Signed and Sealed this
Thirtieth Day of January, 2018

Joseph Matal
*Performing the Functions and Duties of the*
*Under Secretary of Commerce for Intellectual Property and*
*Director of the United States Patent and Trademark Office*